Figure 1:
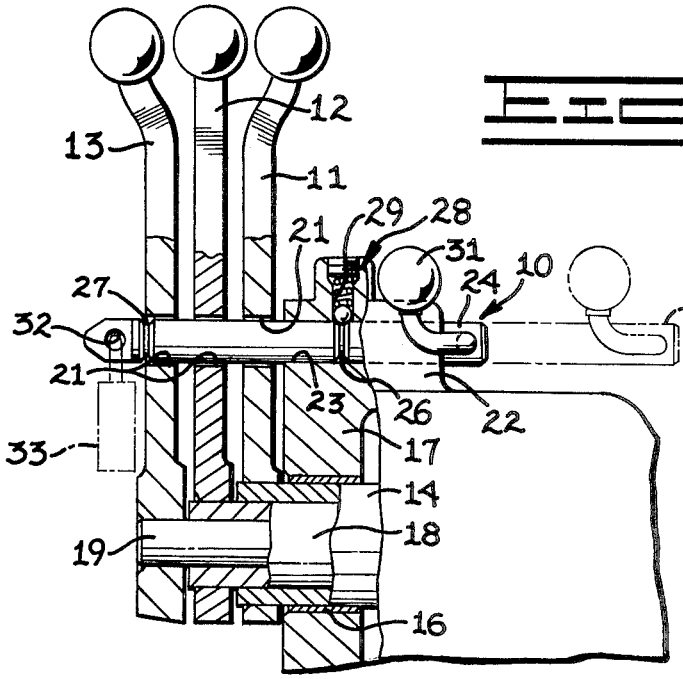
Figure 2:
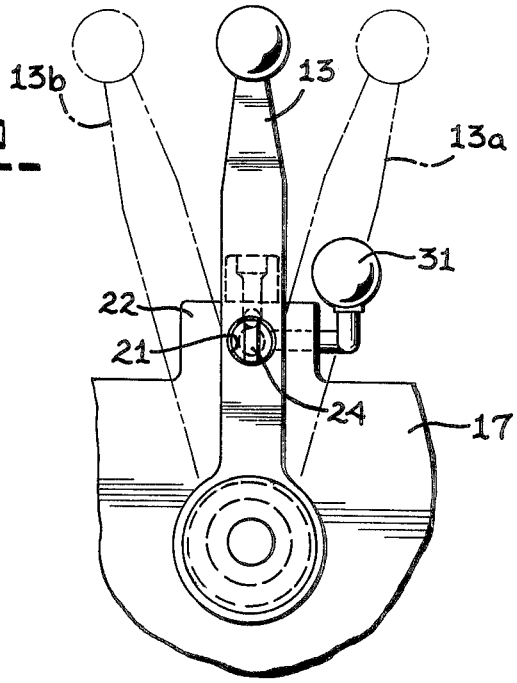

United States Defensive Publication [19] (H) [11] T973,003

Kelly et al. [43] Aug. 1, 1978

[54] LEVER LOCKING ASSEMBLY

[75] Inventors: Orson K. Kelly; Henry J. Perez, both of Aurora, Ill.

[73] Assignee: Caterpillar Tractor Co., Peoria, Ill.

[21] Appl. No.: 884,676

[22] Filed: Mar. 8, 1978

[51] Int. Cl.[2] ..... G05G 5/08

[52] U.S. Cl. ..... 70/200

[57] ABSTRACT

Each of a plurality of levers has a hole extending therethrough with the holes being in axial alignment at a nonoperational position of the levers. A lock bolt is slidably positioned within a bore of a bracket mounted adjacent one of the levers and is movable therethrough to a first position at which the bolt extends through the holes in the levers for maintaining the levers in the nonoperational position and a second position at which the bolt is retracted from the holes and the levers are free to move to their operational positions.

3 Claims, 1 Sheet Drawing,

6 Pages Specification

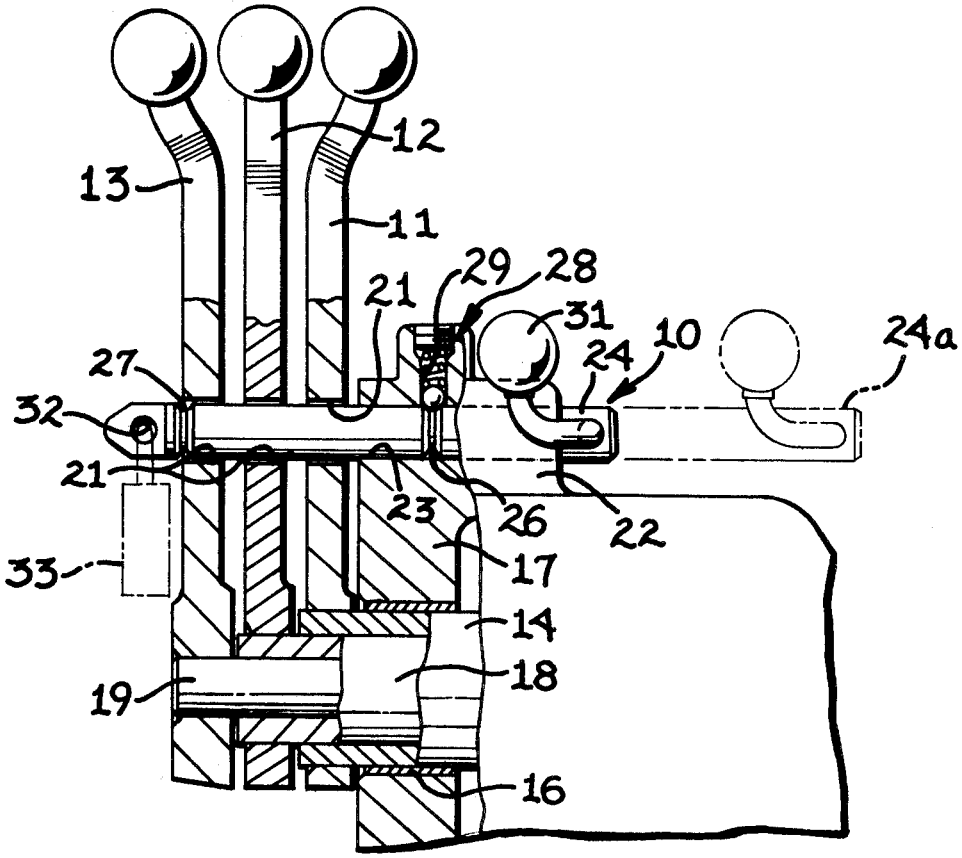

The file of this unexamined application may be inspected and copies thereof may be purchased (849 O.G. 1221, Apr. 9, 1968).